(12) United States Patent
Gonska

(10) Patent No.: US 7,779,969 B2
(45) Date of Patent: Aug. 24, 2010

(54) BRAKE ROTOR AND TONE RING ASSEMBLY

(75) Inventor: David Gonska, Beverly Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 900 days.

(21) Appl. No.: 11/145,407

(22) Filed: Jun. 3, 2005

(65) Prior Publication Data

US 2006/0272906 A1 Dec. 7, 2006

(51) Int. Cl.
*F16D 65/12* (2006.01)
(52) U.S. Cl. ............................... 188/18 A; 188/218 XL
(58) Field of Classification Search ............... 188/18 R, 188/218 XL, 18 A; 303/113.1; 301/105.1, 301/124.1; 180/254–259
See application file for complete search history.

(56) References Cited

U.S. PATENT DOCUMENTS

| 4,017,756 | A | | 4/1977 | Davidson |
| 5,053,656 | A | | 10/1991 | Hodge |
| 5,263,900 | A | * | 11/1993 | Stimson .................. 188/181 R |
| 5,332,065 | A | * | 7/1994 | Steele et al. .............. 188/18 R |
| 5,472,059 | A | | 12/1995 | Schlosser |
| 5,739,684 | A | * | 4/1998 | Burns ......................... 324/173 |
| 5,941,335 | A | | 8/1999 | Krisher |
| 6,073,713 | A | | 6/2000 | Brandenburg |
| 6,079,512 | A | | 6/2000 | Krisher |
| 6,196,639 | B1 | | 3/2001 | DiPonio |
| 6,490,914 | B1 | | 12/2002 | Brandenburg |
| 6,543,858 | B1 | | 4/2003 | Melton |
| 6,568,512 | B1 | * | 5/2003 | Tolani .................. 188/218 XL |
| 6,642,709 | B2 | | 11/2003 | Heimann |
| 6,945,367 | B1 | * | 9/2005 | Yuhas ....................... 188/18 R |
| 2005/0269174 | A1 | * | 12/2005 | Lin ....................... 188/218 XL |
| 2006/0012242 | A1 | * | 1/2006 | Pete et al. ................. 301/124.1 |
| 2006/0091723 | A1 | * | 5/2006 | Pete et al. ................. 303/113.1 |

FOREIGN PATENT DOCUMENTS

EP 0 952 335 A1 10/1999
WO WO 03/095240 A2 11/2003

* cited by examiner

*Primary Examiner*—Christopher P Schwartz
(74) *Attorney, Agent, or Firm*—Carlson, Gaskey & Olds

(57) ABSTRACT

A wheel assembly includes a wheel hub and brake rotor that rotate about an axis. The brake rotor includes an outer circumferential surface area that cooperates with brake pads to provide braking for the wheel assembly. The brake rotor includes an inner circumferential surface area that has two different sets of mounting bosses. A first set of mounting bosses is spaced circumferentially about the axis and provides a mounting interface for a tone ring as used in an anti-lock brake system. A second set of mounting bosses is also spaced circumferentially about the axis but does not overlap the first set of mounting bosses. The second set of mounting bosses provides a mounting interface for securing a brake rotor and tone ring assembly to the wheel hub.

18 Claims, 3 Drawing Sheets

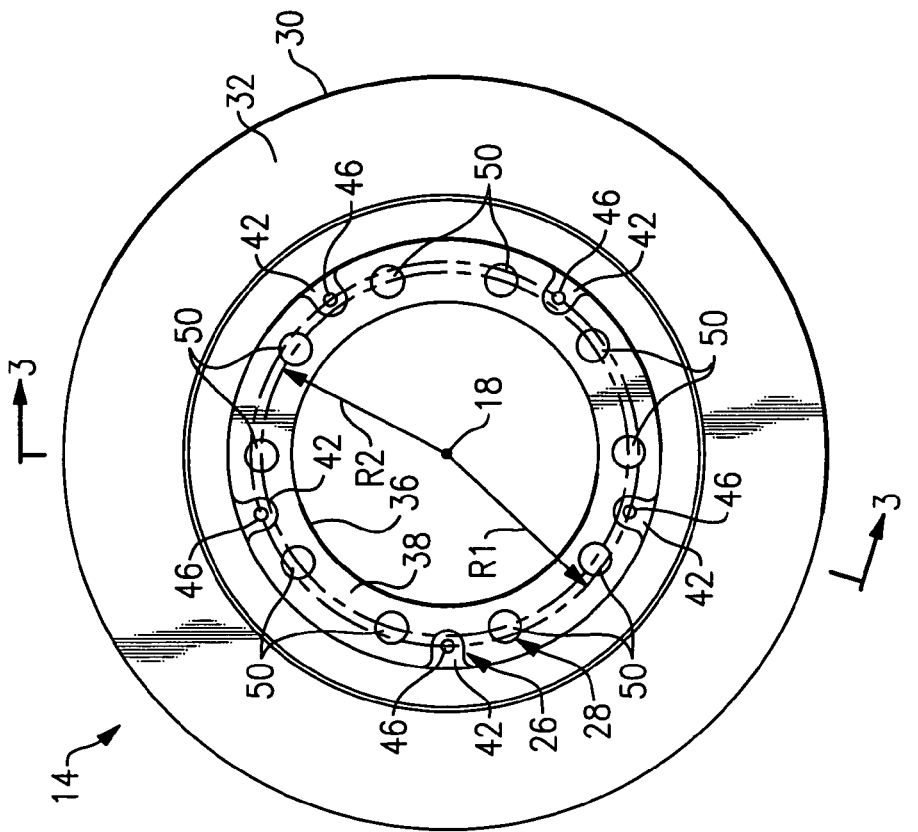
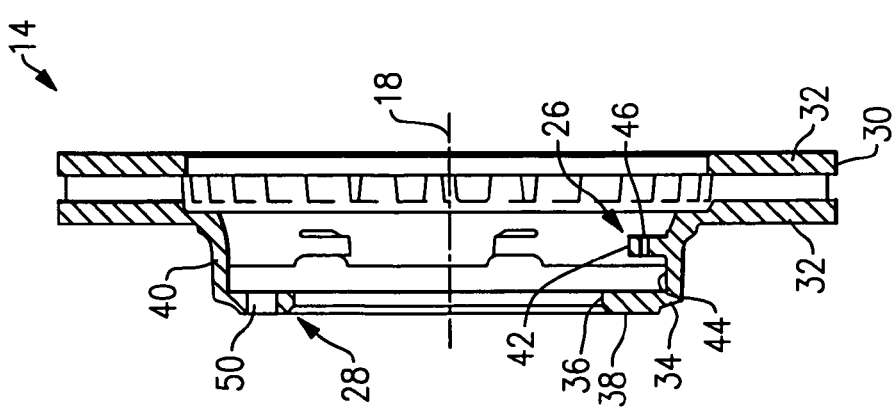

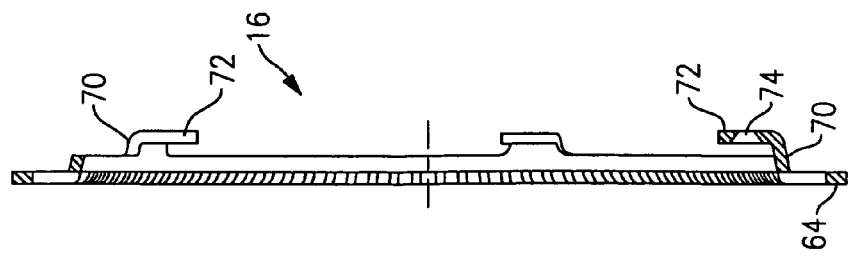
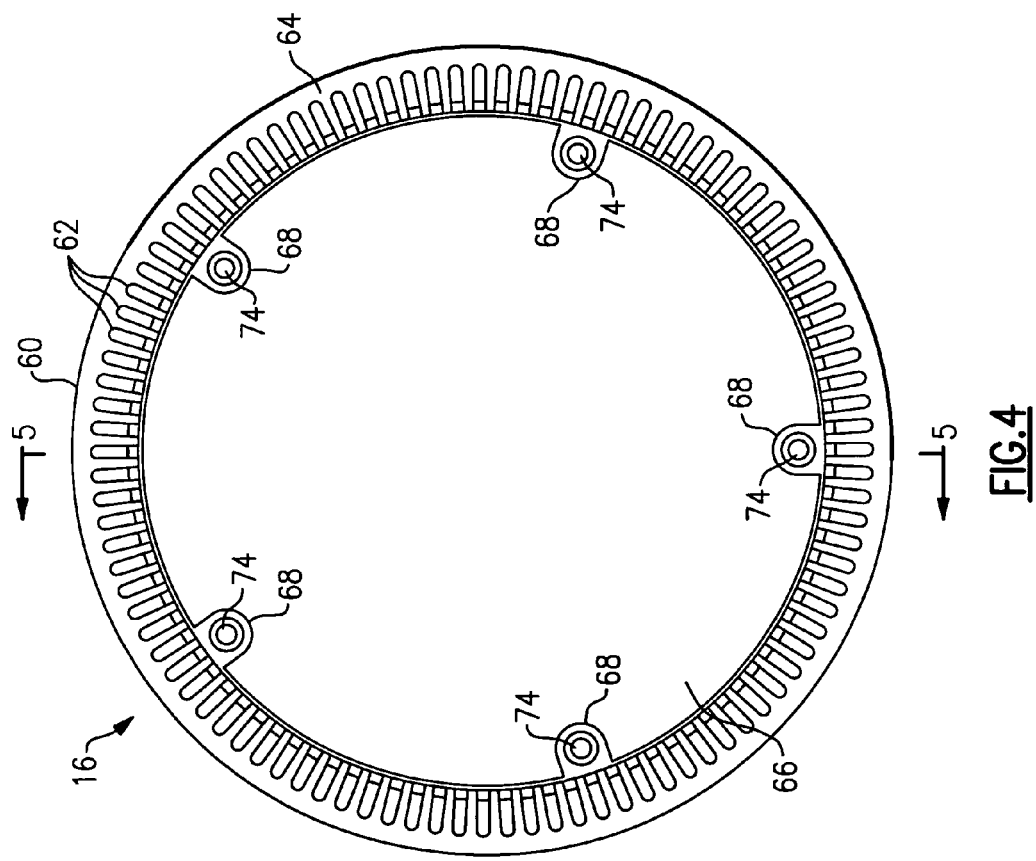

BRAKE ROTOR AND TONE RING ASSEMBLY

TECHNICAL FIELD

The subject invention relates to a brake rotor that provides independent wheel hub and tone ring attachment interfaces such that a tone ring is independently removable from the brake rotor without requiring removal of the brake rotor from the wheel hub, and such that the brake rotor is removable from the wheel hub without have to remove the tone ring from the brake rotor.

BACKGROUND OF THE INVENTION

A wheel assembly includes a brake rotor that is attached to a wheel hub for rotation about an axis. When utilized with an anti-lock brake system, a tone ring is often attached to a rotating wheel component, such as the brake rotor for example, to form part of a wheel speed sensor. Due to packaging constraints, it is often difficult to leave the tone ring attached to the brake rotor while still providing access to attachment bolts that are used to attach the brake rotor to the wheel hub.

In one known configuration, a single set of fasteners is used to attach the tone ring, brake rotor, and wheel hub together. In order to remove the brake rotor from the wheel hub for service, the tone ring must be removed from the brake rotor. Further, in order to remove the tone ring from the brake rotor for service, the brake rotor must be removed from the wheel hub. In either situation, labor costs and downtime are increased as a result of additional wheel components having to be removed from the wheel assembly.

One known attempted solution has been to provide a brake rotor with an integrally formed tone ring. This solution has several disadvantages. One disadvantage with this solution is that both the brake rotor and tone ring are formed from a common material. In order to reduce material costs and component weight, it is often desirable to form the tone ring and brake rotor from different materials. Another disadvantage is that if one component is damaged, i.e. if a portion of the brake rotor or a portion of the tone ring is damaged, then both components have to be replaced. This significantly increases service costs.

Thus, there is a need for a brake rotor, tone ring, and wheel hub configuration that allows for independent removal of the various components without requiring removal of all of the components.

SUMMARY OF THE INVENTION

A wheel assembly includes a tone ring and brake rotor, which are mounted to a wheel hub for rotation about an axis. The tone ring is mounted to the brake rotor at a first mount interface, and the brake rotor is mounted to the wheel hub at a second mount interface that is independent from the first mount interface. The subject invention provides that the brake rotor is removable from the wheel hub without having to remove the tone ring from the brake rotor, and provides that the tone ring is removable from the brake rotor without having to remove the brake rotor from the wheel hub.

In one disclosed embodiment, the brake rotor has a first set of mounting bosses and a second set of mounting bosses that are both circumferentially spaced about the axis. The first set of mounting bosses provides a first mount interface between the tone ring and the brake rotor, and the second set of mounting bosses provides a second mount interface between the brake rotor and the wheel hub. The first set of mounting bosses comprises a first set of openings for receiving a first set of fasteners to attach the tone ring to the brake rotor. The second set of mounting bosses comprises a second set of openings for receiving a second set of fasteners to independently attach the brake rotor to the wheel hub.

This wheel assembly provides several advantages including providing separate pieces for the tone ring and brake rotor, which allows the tone ring to be fabricated from a different material than the brake rotor. Also, as described above, access is provided to the second set of mounting bosses to remove the brake rotor from the wheel hub without having to remove the tone ring from the brake rotor. In addition, removal of the tone ring is possible without having to remove the brake rotor from the wheel hub. This significantly facilitates maintenance, inspection, and cleaning operations for the various components. These and other features of the present invention can be best understood from the following specification and drawings, the following of which is a brief description.

BRIEF DESCRIPTION OF THE DRAWINGS

FIG. 2 is a front view of the brake rotor shown in FIG. 1.

FIG. 3 is a cross-sectional view of the brake rotor of FIG. 2 as indicated by line 3-3 in FIG. 2.

FIG. 4 is a front view of the tone ring shown in FIG. 1.

FIG. 5 is a cross-sectional view of the tone ring of FIG. 4 as indicated by line 5-5 in FIG. 4.

DETAILED DESCRIPTION OF THE PREFERRED EMBODIMENT

Figure 1:
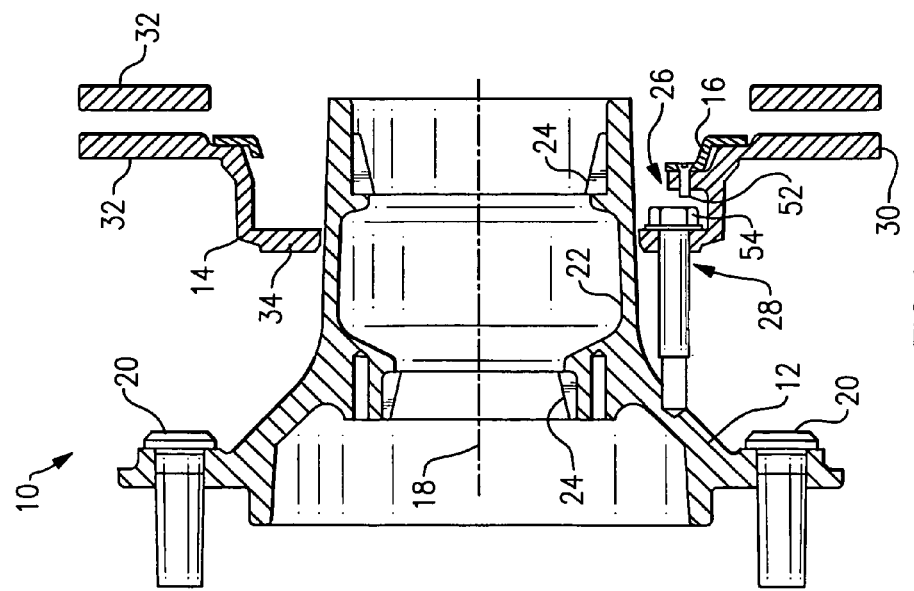
FIG. 1 is a side view of a wheel hub, brake rotor, and tone ring assembly incorporating the subject invention.

A hub and rotor assembly for a vehicle wheel is shown generally at 10 in FIG. 1. The hub and rotor assembly 10 includes a wheel hub 12, a brake rotor 14, and a tone ring 16. The tone ring 16 forms part of a wheel speed sensor for an anti-lock braking system. The hub and rotor assembly 10 can be used with any type of anti-lock braking system. The operation of an anti-lock brake system and wheel speed sensors are well known and will not be discussed in further detail.

The wheel hub 12, brake rotor 14, and tone ring 16 are mounted together for rotation about an axis 18. The wheel hub 12 is mounted to another wheel component (not shown), such as a wheel rim, with a plurality of fasteners 20. The wheel hub 12 includes a central bore 22 that surrounds a non-rotating axle component (not shown), such as a spindle for example. The wheel hub 12 is rotatably supported by a pair of bearings 24 that are positioned between the wheel hub 12 and the spindle.

The brake rotor 14 includes a first set of mounting bosses 26 and a second set of mounting bosses 28 that are both circumferentially spaced about the axis 18 (FIG. 2). The first 26 and second 28 sets of mounting bosses are positioned in a non-overlapping relationship to each other. Thus, the first set of mounting bosses 26 is circumferentially spaced about the axis 18 in a first pattern and the second set of mounting bosses 28 is circumferentially spaced about the axis 18 in a second pattern that is different than the first pattern.

The tone ring 16 is mounted to the brake rotor 14 via the first set of mounting bosses 26 and the brake rotor 14 is independently mounted to the wheel hub 12 via the second set of mounting bosses 28. Thus, the first set of mounting bosses 26 provides a first mount interface between the tone ring 16 and the brake rotor 14 and the second set of mounting bosses 28 provides a second mount interface between the brake rotor 14 and the wheel hub 12. The first mount interface is independent from the second mount interface such that the brake rotor 14 is removable from the wheel hub 12 without having to remove the tone ring 16 from the brake rotor 14, and such that the tone ring 16 is removable from the brake rotor 14 without having to remove the brake rotor 14 from the wheel hub 12.

The brake rotor 14 is shown in greater detail in FIGS. 2 and 3. The brake rotor 14 includes an outer circumferential portion 30 that includes opposing braking surfaces 32 for engagement with frictional material supported by a pair of brake pads (not shown). The brake rotor 14 also includes an inner circumferential portion 34 that includes an opening 36 that surrounds the wheel hub 12 (FIG. 1).

The inner circumferential portion 34 includes a generally flat disc-shaped portion 38 that includes the second set of mounting bosses 28. A wall portion 40 extends from the inner circumferential portion 34 to the outer circumferential portion 30. The wall portion 40 extends generally parallel to the axis 18. The wall portion 40 includes a plurality of extensions 42 that form the first set of mounting bosses 26. Each extension 42 extends radially inwardly from an inner surface 44 of the wall portion 40 toward the axis 18.

The extensions 42 of the first set of mounting bosses 26 each include an aperture 46 that is defined by a first center point. The first center points from all of the apertures 46 are spaced from the axis by a first radial distance R1. The second set of mounting bosses 28 includes a plurality of apertures 50 that are formed within the disc-shaped portion 38. Each aperture 50 is defined by a second center point. The second center points from all of the apertures 50 are spaced from the axis by a second radial distance R2. In the example shown, the first R1 and second R2 radial distances are different from each other to facilitate independent mounting for the tone ring 16 to the brake rotor 14, and for the brake rotor 14 to the wheel hub 12. In the example shown in FIG. 2, the first radial distance R1 is greater than the second radial distance R2, however, an opposite configuration, with the second radial distance R2 being greater than the first radial distance R1, could also be used. Further, the patterns of the apertures could be positioned such that the first R1 and second R2 radial distances are approximately equal.

As shown in FIG. 1, the apertures 46 for the first set of mounting bosses 26 receive a first set of fasteners 52 (only one is shown) to attach the tone ring 16 to the brake rotor 14. The apertures 50 for the second set of mounting bosses 28 receive a second set of fasteners 54 (only one is shown) to attach the brake rotor 14 to the wheel hub 12. Because the apertures 46 for the first set of mounting bosses 26 do not overlap the apertures 50 for the second set of mounting bosses 28 installation of the first 52 and second 54 sets of fasteners do not interfere with each other.

The tone ring 16 is shown in greater detail in FIGS. 4 and 5. The tone ring 16 includes an outer circumferential portion 60 that includes a plurality of slots 62 that are circumferentially spaced about the axis 18. The slots 62 cooperate with other wheel speed sensor components (not shown) to measure and monitor wheel speed as known. The outer circumferential portion 60 includes a ring-shaped body 64 that includes a center opening 66. When mounted to the wheel hub 12 the center opening 66 surrounds the spindle.

The tone ring 16 also includes a plurality of tabs 68 that extend radially inwardly from the outer circumferential portion 60. Each tab 68 includes a support portion 70 that extends transversely relative to the ring-shaped body 64. The support portions 70 axially extend in a direction along the axis 18. From an outer end of each support portion 70 extends a mount portion 72. The mount portions 72 each include an aperture 74 that is aligned with a corresponding aperture 46 on the extensions 42 of the first set of mounting bosses 26.

Figure 6:
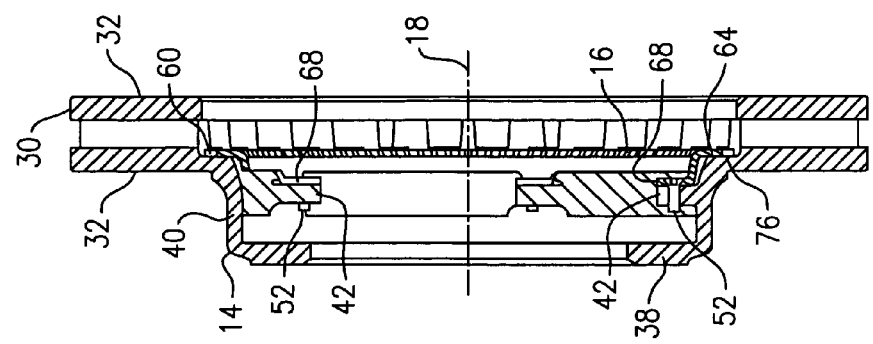
FIG. 6 is a side view of an assembly of the brake rotor and the tone ring.

The apertures 74, 46 receive the first set of fasteners 52 to attach the tone ring 16 to the brake rotor 14 as shown in FIG. 6. The brake rotor 14 includes recessed area 76 into which the ring-shaped body 64 extends.

The wheel hub 12 includes a plurality of apertures (not shown) that are aligned with the apertures 50 formed in the disc-shaped portion 38. The apertures 50 in the disc-shaped portion 38 and the apertures in the wheel hub 12 receive the second set of fasteners 54 to attach the brake rotor 14 to the wheel hub 12. To facilitate assembly, the tone ring 16 can first be attached to the brake rotor 14 to form a brake rotor and tone ring sub-assembly. The brake rotor and tone ring subassembly can then be attached to the wheel hub 12 as a unit.

This unique configuration provides separate pieces for the tone ring 16 and brake rotor 14, which allows the tone ring 16 to be fabricated from a different material than the brake rotor 14. This provides weight saving, material, and manufacturing benefits. Also, as described above, access is provided to the second set of mounting bosses 28 to remove the brake rotor 14 from the wheel hub 12 without having to remove the tone ring 16 from the brake rotor 14, in addition to allowing removal of the tone ring 16 without having to remove the brake rotor 14 from the wheel hub 12. This significantly facilitates maintenance, inspection, and cleaning operations for the various components.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A wheel assembly comprising:
   a wheel hub defining an axis of rotation;
   a brake rotor having a first set of mounting bosses and a second set of mounting bosses that are both circumferentially spaced about said axis of rotation wherein said brake rotor includes an inner circumferential portion with an opening surrounding an outer surface of said wheel hub, an outer circumferential portion defining a braking surface, and a wall portion interconnecting said inner circumferential portion with said outer circumferential portion, said first set of mounting bosses being formed within said wall portion and said second set of mounting bosses being formed within said inner circumferential portion; and
   a tone ring mounted to said brake rotor wherein said first set of mounting bosses provides a first mount interface between said tone ring and said brake rotor and said second set of mounting bosses provides a second mount interface between said brake rotor and said wheel hub, said first mount interface being independent from said second mount interface such that said brake rotor is removable from said wheel hub without having to remove said tone ring from said brake rotor and such that said tone ring is removable from said brake rotor without having to remove said brake rotor from said wheel hub.

2. The wheel assembly according to claim 1 wherein said wall portion extends in a direction generally parallel to said axis of rotation with said first set of mounting bosses comprising a plurality of extensions extending radially inward from said wall portion toward said axis of rotation, each of said plurality of extensions being axially spaced apart from said inner circumferential portion in a direction along said axis of rotation, and wherein said inner circumferential portion comprises a disc-shaped portion with said second set of mounting bosses being formed within said disc-shaped portion.

3. The wheel assembly according to claim 2 wherein said plurality of extensions of said first set of mounting bosses includes a first plurality of mounting holes adapted to receive a first plurality of fasteners to secure said tone ring to said brake rotor and wherein said second set of mounting bosses includes a second plurality of mounting holes adapted to receive a second plurality of fasteners to secure said brake rotor to said wheel hub.

4. The wheel assembly according to claim 1 wherein said inner circumferential portion comprises a generally flat disc-shaped portion with said second set of mounting bosses including a plurality of apertures extending through said generally flat disc-shaped portion, each of said plurality of apertures being adapted to receive a fastener.

5. The wheel assembly according to claim 1 wherein said wall portion extends in a direction generally parallel to said axis of rotation with said first set of mounting bosses comprising a plurality of discretely spaced extensions extending radially inwardly from said wall portion toward said axis of rotation, each of said plurality of discretely spaced extensions including an opening adapted to receive a fastener.

6. A method for assembling a wheel comprising the steps of:
  (a) forming a first mount interface in a brake rotor to include a first plurality of openings, and mounting a tone ring to the brake rotor at the first mount interface;
  (b) forming a second mount interface in the brake rotor to include a second plurality of openings, and mounting the brake rotor to a wheel hub at the second mount interface that is independent from the first mount interface such that the brake rotor is removable from the wheel hub without having to remove the tone ring from the brake rotor and such that the tone ring is removable from the brake rotor without having to remove the brake rotor from the wheel hub; and
  (c) inserting a first set of fasteners through the first plurality of openings to secure the tone ring and brake rotor together, and inserting a second set of fasteners through the second plurality of openings to secure the brake rotor and wheel hub together.

7. The method according to claim 6 wherein the wheel hub, brake rotor, and tone ring rotate about an axis of rotation and including defining each of the first plurality of openings with a center that is positioned at a first radial distance from the axis of rotation and defining each of the second plurality of openings with a center that is positioned at a second radial distance from the axis of rotation different from the first radial distance.

8. The method according to claim 7 wherein the first radial distance is greater than the second radial distance.

9. The method according to claim 6 wherein the wheel hub, brake rotor, and tone ring rotate about an axis of rotation and including circumferentially spacing the first plurality of openings about the axis of rotation and circumferentially spacing the second plurality of openings about the axis of rotation such that the first and second plurality of openings have a non-overlapping relationship.

10. The method according to claim 6 wherein the tone ring comprises an anti-lock brake component that is rotatable about an axis of rotation, and including forming each of the first plurality of openings and each of the second plurality of openings to extend in a direction generally parallel to the axis of rotation.

11. A method for assembling a wheel comprising the steps of:
  (a) mounting a tone ring to a brake rotor at a first mount interface;
  (b) mounting the brake rotor to a wheel hub at a second mount interface that is independent from the first mount interface such that the brake rotor is removable from the wheel hub without having to remove the tone ring from the brake rotor and such that the tone ring is removable from the brake rotor without having to remove the brake rotor from the wheel hub; and
  (c) selectively removing the brake rotor from the wheel hub without removing the tone ring from the brake rotor to perform service operations as needed.

12. The method according to claim 11 including the step of selectively removing the tone ring from the brake rotor without removing the brake rotor from the wheel hub to perform service operations as needed.

13. A method for assembling a wheel comprising the steps of:
  (a) mounting a tone ring to a brake rotor at a first mount interface; and
  (b) mounting the brake rotor to a wheel hub at a second mount interface that is independent from the first mount interface such that the brake rotor is removable from the wheel hub without having to remove the tone ring from the brake rotor and such that the tone ring is removable from the brake rotor without having to remove the brake rotor from the wheel hub; and
  (c) selectively removing the tone ring from the brake rotor without removing the brake rotor from the wheel hub to perform service operations as needed.

14. A wheel assembly comprising:
  a wheel hub defining an axis of rotation;
  a brake rotor having a first set of mounting bosses and a second set of mounting bosses that are both circumferentially spaced about said axis of rotation wherein each boss of said first set of mounting bosses is defined by a first center that is located at a first radial distance from said axis of rotation, and wherein each boss of said second set of mounting bosses is defined by a second center that is located at a second radial distance from said axis of rotation, said first radial distance being different from said second radial distance; and
  a tone ring mounted to said brake rotor wherein said first set of mounting bosses provides a first mount interface between said tone ring and said brake rotor and said second set of mounting bosses provides a second mount interface between said brake rotor and said wheel hub, said first mount interface being independent from said second mount interface such that said brake rotor is removable from said wheel hub without having to remove said tone ring from said brake rotor and such that said tone ring is removable from said brake rotor without having to remove said brake rotor from said wheel hub.

15. The wheel assembly according to claim 14 wherein said first radial distance is greater than said second radial distance.

16. A wheel assembly comprising:
  a wheel hub defining an axis of rotation;
  a brake rotor having a first set of mounting bosses and a second set of mounting bosses that are both circumferentially spaced about said axis of rotation wherein said first set and said second set of mounting bosses have a non-overlapping relationship with each other; and a tone ring mounted to said brake rotor wherein said first set of mounting bosses provides a first mount interface between said tone ring and said brake rotor and said second set of mounting bosses provides a second mount interface between said brake rotor and said wheel hub, said first mount interface being independent from said second mount interface such that said brake rotor is removable from said wheel hub without having to remove said tone ring from said brake rotor and such that said tone ring is removable from said brake rotor without having to remove said brake rotor from said wheel hub.

17. A wheel assembly comprising:

a wheel hub defining an axis of rotation;

a brake rotor having a first set of mounting bosses and a second set of mounting bosses that are both circumferentially spaced about said axis of rotation; and a tone ring mounted to said brake rotor wherein said first set of mounting bosses provides a first mount interface between said tone ring and said brake rotor and said second set of mounting bosses provides a second mount interface between said brake rotor and said wheel hub, said first mount interface being independent from said second mount interface such that said brake rotor is removable from said wheel hub without having to remove said tone ring from said brake rotor and such that said tone ring is removable from said brake rotor without having to remove said brake rotor from said wheel hub, and wherein said first and second mount interfaces define first and second bolted joint interfaces such that said tone ring is fastened directly to said brake rotor at said first bolted joint interface and said brake rotor is fastened directly to said wheel hub at said second bolted joint interface.

18. A wheel assembly comprising:

a wheel hub defining an axis of rotation;

a brake rotor having a first set of mounting bosses and a second set of mounting bosses that are both circumferentially spaced about said axis of rotation wherein said first set of mounting bosses includes a first plurality of apertures and said second set of mounting bosses includes a second plurality of apertures, said first and said second plurality of apertures extending in a direction generally parallel to said axis of rotation; and a tone ring mounted to said brake rotor wherein said first set of mounting bosses provides a first mount interface between said tone ring and said brake rotor and said second set of mounting bosses provides a second mount interface between said brake rotor and said wheel hub, said first mount interface being independent from said second mount interface such that said brake rotor is removable from said wheel hub without having to remove said tone ring from said brake rotor and such that said tone ring is removable from said brake rotor without having to remove said brake rotor from said wheel hub, and wherein said tone ring comprises an anti-lock brake component that is rotatable about the axis of rotation.

* * * * *